United States Patent [19]
Bottoms, Jr. et al.

[11] Patent Number: 5,325,457
[45] Date of Patent: Jun. 28, 1994

[54] FIELD PROTECTED SELF-SUPPORTING FIBER OPTIC CABLE

[76] Inventors: Jack Bottoms, Jr., 12090 Lonsdale La., Roswell, Ga. 30075; Charles L. Carter, 350 Singletree Trace, Alpharetta, Ga. 30210; Charles L. Carson, 3290 Arborwoods Dr., Alpharetta, Ga. 30202

[21] Appl. No.: 862,934

[22] Filed: Apr. 3, 1992

Related U.S. Application Data

[63] Continuation-in-part of Ser. No. 763,410, Sep. 20, 1991, Pat. No. 5,230,034.

[51] Int. Cl.$^5$ .............................................. G02R 6/44
[52] U.S. Cl. ................... 385/113; 385/100; 385/102; 385/111
[58] Field of Search ............... 385/100, 102, 104, 105, 385/107, 108, 109, 110, 111, 113; 333/239

[56] References Cited

U.S. PATENT DOCUMENTS

| | | | |
|---|---|---|---|
| 3,790,694 | 2/1974 | Portinari | 174/23 R |
| 4,038,489 | 7/1977 | Stenson et al. | 174/70 |
| 4,143,942 | 3/1979 | Anderson | 350/96.23 |
| 4,318,588 | 3/1982 | Ziedler et al. | 385/113 |
| 4,342,500 | 8/1982 | Oestreich et al. | 350/96.23 |
| 4,374,608 | 2/1983 | Anderson | 350/96.23 |
| 4,557,558 | 12/1985 | Bresser | 385/104 |
| 4,711,523 | 12/1987 | Iri et al. | 385/109 |
| 4,755,020 | 7/1988 | Willis et al. | 385/109 |
| 4,776,665 | 10/1988 | Oestreich | 350/96.23 |
| 4,786,137 | 11/1988 | Cornelison et al. | 350/96.23 |
| 4,792,774 | 12/1988 | Walter et al. | 333/239 |
| 4,822,133 | 4/1989 | Peacock | 350/96.23 |
| 4,838,635 | 6/1989 | Oestreich | 350/96.23 |
| 4,859,024 | 8/1989 | Rahman | 385/113 |
| 4,869,573 | 9/1989 | Radage et al. | 350/96.23 |
| 4,892,382 | 1/1990 | Story et al. | 350/96.23 |
| 4,913,515 | 4/1990 | Braunmiller et al. | 350/96.23 |
| 4,946,237 | 8/1990 | Arroyo et al. | 350/96.23 |
| 4,966,434 | 10/1990 | Yonechi et al. | 350/96.23 |
| 4,969,706 | 11/1990 | Hardin et al. | 385/100 |
| 5,013,126 | 5/1991 | Hattori et al. | 350/96.23 |
| 5,016,973 | 5/1991 | Hager et al. | 350/96.23 |

OTHER PUBLICATIONS

Gladenbeck et al., *Optical Fiber Cable for Overhead Line Systems*, Sixth ECOC, University of York, Sep. 1980, pp. 359–362.

(List continued on next page.)

*Primary Examiner*—Frank Gonzalez
*Assistant Examiner*—Stephen W. Barns
*Attorney, Agent, or Firm*—Jones & Askew

[57] ABSTRACT

An all dielectric self-supporting fiber optic communication cable for use between spaced-apart support towers of an electrical power transmission network. A central core including at least one optical fiber is surrounded by a layer of non-conductive stranded strength members that are wound about the core. The core includes a plurality of pliable buffer tubes, each of which houses a bundle of optical fibers. The buffer tubes are helically wound about a cylindrical element in order to provide temperature performance by preventing the buffer tubes from experiencing thermally induced movement when exposed to varying temperatures. Each of the stranded strength members comprises a bundle of non-conducting filaments or fibers that are formed about a reinforcing element and encapsulated by individual polyethylene jackets. The reinforcing element reduces the tendency of the filaments to compress as the extruded jacket cures. The stranded strength members are helically wound about the central core. An outer protective jacket is formed about the stranded strength members and encloses the entire cable. A faraday shield formed along the outer jacket brings the electric field to zero in the vicinity of the outer jacket, thus reducing or eliminating tracking currents along the surface of the outer jacket.

47 Claims, 4 Drawing Sheets

OTHER PUBLICATIONS

Sekizawa et al., *Optical Systems for Electric Power Companies*, OSA/IEEE Topical Meeting on Optical Fiber Transmission, Williamsburg, Virginia, Feb. 22-24, 1977, ThB3-1.

Baskett et al., *Fiber Optic Cables*, Electrical Communication Technical Journal published by ITT, 1977, pp. 49-53.

Superior Optics advertisement appearing in "Transmission and Distribution", in Apr., 1988.

"The Presstime Bulletin-New Firm To Make Aerial FO Cable", Photonics Spectra, Apr. 1988, p. 10.

Sumitomo Electric Publication entitled "Technical Specification For 2-36 Fiber Loose Tube Figure 8 Style Optical Cable With All-dielectric Support Messenger For Self-supporting Applications"; Mar. 22, 1989.

Wilhelmi, et al., *Installation of an Operational Two-Kilometer Fiber Optic Cable*, 26 Proceedings of International Wire and Cable Symposium, Cherry Hill, N.J., Nov. 15-17, 1977.

Murata et al., *Step Index Type Optical Fiber Cable*, First European Conference Optical Fiber Communications (ECOC), London, Sep. 16-18, 1975, pp. 70-72.

Lobel, *Fiber Optic Cable Designs and Installation Practices*, IEE Transportation Division, New York Section, Seminar Nov. 13, 1985.

FIELD PROTECTED SELF-SUPPORTING FIBER OPTIC CABLE

CROSS REFERENCE TO RELATED APPLICATION

This application is a continuation-in-part of application Ser. No. 07/763,410, filed Sep. 20, 1991, now U.S. Pat. No. 5,230,034, issued Jul. 20, 1993, entitled "ALL DIELECTRIC SELF-SUPPORTING FIBER OPTIC CABLE".

TECHNICAL FIELD

The present invention relates generally to fiber optic communication cables, and more particularly relates to an all dielectric or non-conducting self-supporting fiber optic cable suitable for use with overhead electrical power transmission and distribution lines suspended between spaced-apart support towers or pylons.

BACKGROUND OF THE INVENTION

Electrical power utilities own or control rights of way for the transmission of bulk electrical energy over long distances. Typically, the utilities erect support towers or pylons for stringing 3-phase electrical conductors. These utilities have large investments in such rights of way and seek to optimize the return on these investments.

Utilities have in the past also erected communications cables in their rights of way for the purpose of maintaining communications between generating plants and other utility facilities. In the late 1970's and early 1980's, the utilities sought to utilize the high communication bandwidth of optical fiber communications technologies, which were just then becoming available.

Also in the 1980's, private long distance telephone carriers entered the market for long distance telephone communications, especially in the United States after the divestiture of AT&T, which separated the long distance carriers from the regional telephone operating companies. Electrical utilities have recently sought to take advantage of their rights of way by installing excess capacity in their communications cables and selling such capacity to regional telephone operating companies and private long distance telephone carriers as an additional source of revenue. Since optical fiber communications offer such significant bandwidths (e.g., a single optical fiber can carry over 10,000 simultaneous telephone conversations), utilities have sought efficient and effective means for installing fiber optic communication channels in their rights of way.

Any communication means provided in electrical utility rights of way must operate in the environment of strong electric and magnetic fields which emanate from the power transmission conductors. It is therefore problematic to use coaxial or other cables that include metal or other electrical conductors, because of noise and the inducement of electric currents. It is believed that optical fiber communications cables are preferable to any type of electrical communications cables because of higher communications capacity and immunity to interference.

Optical fibers for communications cables are usually provided in one of two configurations. In the first configuration, the optical fibers are contained within an electrically conductive cable installed as a ground wire, also called optical fiber overhead groundwire ("OPGW"). Examples of this approach are found in U.S. Pat. Nos. Re. 32,374 to Dey et al. and 4,944,570 to Oglesby et al. The ground wire is placed above the phase conductors in order to protect the system from electrical faults and from high current surges induced by a direct or near-by lightning strikes. Since OPGW cables are by definition electrical conductors, there is no concern about induced electrical currents in the conductors and the optical fibers are nonconductive and therefore immune to interference.

In a second configuration, the optical fibers are provided in a separate, self-supporting cable. This type of fiber optic cable does not take the place of a ground wire. Instead, the fiber optic cable is installed in self-supporting manner in addition to, and generally below, the phase and ground conductors and provides another way to add optical fiber communications capability to the rights-of-way of existing overhead electrical transmission and distribution systems. Typically, this self-supporting type of fiber optic cable would be placed below the ground wire in the vicinity of the phase conductors. Accordingly, it is important that such fiber optic cables be impervious or highly resistant to the induction of electrical currents because of the strong electrical fields from the power conductors.

Preferably, such non-OPGW cables are constructed of all-dielectric (i.e., non-conductive) materials in order to avoid problems associated with the strong electric fields. Using a nonconductive material also avoids problems such as excess heat resulting from current flowing through the cable, and the need to provide means for insulating or dissipating the unwanted induced current in order to prevent electrical shock to utility personnel and damage to equipment.

Various types of all dielectric or non-conducting self-supporting fiber optic cables are known in the art. Since optical fibers are fragile and prone to fail when subjected to too much tension, these cables typically utilize strength members comprising a non-conducting filament (such as DuPont's Kevlar ® brand aramid fiber) or glass reinforced plastic to provide longitudinal strength for the cable. Prior to the present invention, the aramid or other plastic strength member has been stranded together or formed into a mesh and sealed within a plastic coating, cladding, or jacket. Examples of various approaches are demonstrated in U.S. Pat. Nos. 4,342,500, 4,776,665, 4,822,133, 4,838,635, 4,374,608, 4,892,382, and 5,016,973.

It is known that the cladding or jacket of such all-dielectric or non-conducting cables can be damaged or destroyed by various means. Abrasion may result from animals or during installation, and punctures can occur from projectiles (e.g., shotgun pellets) or other objects that come in contact with the jacket of the cable. In addition, the jacket of such cables can be damaged or destroyed by partial electrical discharge events that result from electrical currents induced on the cable jacket especially when wet, particularly in high-tension networks where the transmitted voltage exceeds 138 kV. These partial discharge events are known by those skilled in the art as "dry-band arcing" and are caused by moisture and other contaminants on the outer surface of the cable cladding. As a wet cable dries, it does not do so uniformly, and small dry areas may be formed about the circumference of the cable at various places. The electrical currents, also called "tracking currents", that are induced in the remaining wet portions of the cable surface may be great enough to support an arc across these dry bands. When this dry-band arcing occurs, heat and oxidation are generated that damage, and may eventually destroy, the cable jacket.

Eventually, the dry-band arcing or abrasion may result in the outer jacket of the cable being penetrated so that the interior portions of the cable are exposed to moisture and other contaminants. Once the integrity of the cable jacket is compromised and the woven or non-woven filament type strength members are exposed to moisture, migration of the water throughout the cable is facilitated by the "wicking" action of the filaments themselves.

Once wicking has occurred, the cables are prone to sudden, catastrophic failure. Such failure generally results in one of two ways. In a first scenario, the volume of water entering the cable may eventually become so great that the cable collapses under its own weight. In a second scenario, the cable actually explodes as a result of the induced electrical current through the cable, which is now conductive because of water or moisture.

Penetration of the outer jacket is also undesirable because it may result in the strength members being exposed to ultraviolet light. It is known that prolonged exposure of Kevlar fibers to ultraviolet light results in the degradation of the strength properties of the Kevlar. Such degradation results in the weakening and potential failure of the cable.

Various cable designs have been developed to address the problems of dry band arcing and jacket penetration. Different types of jacketing constructions have been attempted in order to reduce the likelihood that the jacket will be penetrated as a result of abrasion. Examples of this approach may be found in the U.S. Patents cited above.

Other cable designs vary the composition of the cable in an effort to avoid damage resulting from dry-band arcing. Such changes include reducing the carbon content of the cable's outer jacket, and including additives that reduce the damage otherwise caused by the arching. A wide variety of materials will survive in the electric fields associated with power lines operating at or below 150 kV. Transmission systems operating in the range between 150 kV and 275 kV have been found to require special materials. At voltages above 275 kV, difficulties have been experienced developing a non-metal composition that will survive in the strong electric fields long enough to meet the needs of the electric power industry. An example of one attempt to control the dry-band arcing problem is found in U.S. Pat. No. 4,776,665 to Oestreich, where the cable itself is made slightly conductive in order to reduce the occurrence of dry-band arcing.

Other problems have been encountered in producing all dielectric self-supporting fiber optic cables. Those skilled in the art will appreciate that extruded jackets made of polyethylene or similar materials exhibit a tendency to shrink as they cure. When a cable's strength members include isolating jackets extruded about a bundle of flexible, non-conducting filaments or fibers, the shrinkage of the jacket along its longitudinal axis causes the filaments themselves to be compressed, likely due to friction between the extruded jacket and the filaments. As a result of the compression of the load bearing filaments, tension exerted upon the cable during installation will cause it to stretch until the filaments return to their original length and load is imparted to the filaments.

When a cable is first suspended between the towers employed in a power distribution system, the weight of the cable itself causes tension to be exerted upon the cable. Since the polyethylene jacket and other elements of the cable are unable to bear this initial load, the cable stretches until the compressed load bearing filaments return to their original length and tension is transmitted to the bundles of filaments. Two problems result from this initial elongation of the cable. The elongation leads to sagging of the cable and results in a reduction of the clearance between the ground and the cable. More importantly, however, the elongation causes tension to be transmitted to the optical fibers that are included in the cable's core. Those skilled in the art will appreciate that such tension eventually results in the attenuation of the amount of light passing through the optical fiber, or breakage of the optical fiber. In either case, the cable is no longer capable of effectively performing the task it was installed to do.

Despite prior art attempts to solve the problems associated with all-dielectric self supporting cables, prior self-supporting fiber optic cables are still susceptible to failure. Therefore, there is still a significant need for a non-conducting self-supporting fiber optic cable for use in conjunction with existing groundwires that demonstrates an improvement in prior art designs.

SUMMARY OF THE INVENTION

The present invention overcomes the above-described problems in prior art non-OPGW type fiber optic communication cables by providing an improved all dielectric or non-conducting self-supporting fiber optic cable. Where prior art designs rely on woven or mesh-like bundles of filaments to provide the requisite tensile strength required for the cable, the present invention incorporates a novel approach by dividing the filaments into separate bundles forming stranded strength members that are wound about a central core. By separating the filaments in this manner, the present invention reduces the likelihood of catastrophic failure typically encountered when the outer covers of jacketed self-supporting cables are penetrated.

Briefly described, the present invention provides a non-conducting self-supporting fiber optic cable that includes a non-conducting central core containing at least one optical fiber, and at least one layer of non-conducting stranded strength members that are wrapped around the core. An important aspect of the present invention is that each of the stranded strength members is enclosed within its own individual jacket made of polyethylene or a similar material. In this manner, the bundles of filaments that make up the strength members are isolated from one another. As a result, though one bundle of filaments may be exposed to water and ultraviolet light when its jacket is penetrated, the jackets around the other bundles may remain intact and those bundles would therefore remain free from water and unexposed to ultraviolet light.

More particularly described, the present invention provides an all dielectric self-supporting fiber optic cable made up of a central core that includes at least one buffer tube containing at least one optical fiber, a tubular inner jacket formed about the core, and at least one layer of non-conducting separately jacketed stranded strength members wound about the tubular inner jacket. Preferably, the buffer tubes are wound (either helically, or using a reverse oscillating lay) about a means for preventing thermally induced movement of the buffer tubes, for example, a cylindrical rod comprising glass or similar material having a coefficient of thermal expansion about the same as that of the primary constituent in the optical fibers. The glass rod reduces the tendency of the buffer tubes to shrink and impart stress to the optical fibers when exposed to low temperatures because of their being tightly held against the cylindrical rod.

Also, the strength members are preferably counter-helically wound about the core (i.e., wound in the direction opposite the direction of lay of the buffer tubes).

Another aspect of the present invention is that the bundles of filaments that make up the strength members are isolated from one another by means encapsulating each one of the strength members, for example, individual protective isolating jackets. In contrast to prior art approaches involving the use of filament strength members located within an outer jacket, the use of separately jacketed and isolated stranded strength members greatly reduces the ability of the filaments to wick water throughout the length of the cable. In addition, the use of separately stranded strength members allows fewer filaments to be exposed to ultraviolet light.

In another embodiment, each separately jacketed stranded strength member also includes a cylindrical fiberglass reinforcement element in order to reduce the amount of compression experienced by the filaments as the extruded polyethylene jacket cures. During manufacture, aramid filaments are bundled about a small fiberglass rod and fed through a machine that extrudes a plastic coating about each of the bundles formed by the filaments and the rod. As the isolating jacket cools, the friction between the non-conducting filaments and the reinforcing element greatly reduces the amount of longitudinal compression experienced by the filaments during the curing process. By reducing the compression of the aramid fibers, the cable experiences less sag after it is installed. Consequently, the optical fibers located within the core of the cable are not subject to tension sufficient to cause micro-bending and attenuation of the light transmitted through the fibers.

In accordance with the principles of the invention, catastrophic failure is avoided by reducing the number of filaments exposed to ultraviolet light, and by reducing the volume of water that is likely to enter the cable after the outer covering has been penetrated. Although preferred embodiments of present invention include an outer cover that is chosen for its strength, abrasion-resistance, and ability to withstand dry-band arcing, the present invention does not rely on an outer jacket or any of these other features to prevent catastrophic failure. Instead, in the present invention the strength filaments are separated into a plurality of stranded strength members comprising bundles of filaments, each of which is enclosed in its own polyethylene jacket. The cable's overall propensity to wick water is minimized by separating the strength members into a plurality of individual and separately jacketed strength members, thereby reducing the number of filaments exposed to the water in the event that the outer jacket or some of the strength member's jackets are damaged. Each separately jacketed strength member can be flooded with a water blocking compound to further inhibit wicking. In the event the outer jacket is penetrated, the separately stranded strength members are less likely to be exposed to ultraviolet light which degrades the strength properties of the cable.

Thus, if a cable having a solid mesh of Kevlar® filaments is cut, water could be wicked throughout the cable by 100% of the filaments located around the circumference of the cable. However, if a cable constructed according to the principles of the present invention has 12 strands and the outer jacket and one of the strength members' jackets is cut, water would be wicked by only 8.3% of the total number of filaments located around the circumference of the cable. By so limiting the ability of the cable to absorb water, both the added weight due to the volume of water, and the electric currents induced in the water by the electric field are reduced, and the cable is much less likely to experience catastrophic failure.

In yet another embodiment, the outer jacket of the all dielectric cable is surrounded by a faraday shield. The faraday shield comprises a metallic tape or mesh. In order to preserve the lightweight characteristics of the all dielectric cable, the metal used in the faraday shield is preferably aluminum. By providing a faraday shield, this embodiment prevents the electric field from inducing currents on the surface of the the plastic portions of the cable, thus mitigating tracking currents and the resulting problems associated with dry-band arcing. The faraday shield enables a lightweight all-dielectric cable to be used in transmission systems where the voltage exceeds 250 kV.

Accordingly, it is an object of the present invention to provide an improved all dielectric self supporting fiber optic cable.

It is another object of the present invention to minimize the likelihood of catastrophic failure in an all-dielectric self-supporting fiber optic cable in the event the outer protective jacket is penetrated.

It is another object of the present invention to provide an improved all dielectric self supporting fiber optic cable having separately jacketed multi-filament strength members.

It is a further object of the present invention to minimize the number of strength filaments that are exposed to ultraviolet light in the event the outer protective jacket is penetrated.

It is a further object of the present invention to minimize the amount of water that may be absorbed by the cable in the event the outer protective jacket is penetrated.

It is a further object of the present invention to minimize the added weight due to water being absorbed by the cable in the event the outer protective jacket is penetrated.

It is a further object of the present invention to minimize the damage due to electric currents induced in water which has been absorbed by the cable in the event the outer protective jacket is penetrated.

It is another object of the present invention to provide an all dielectric fiber optic communication cable wherein the buffer tubes housing the optical fibers are protected against shrinkage when exposed to low temperatures so as to minimize stresses placed on the optical fibers contained therein.

It is another object of the present invention to provide an improved fiber optic communication cable wherein the optical fibers are protected from strain resulting from thermal expansion or contraction of buffer tubes housing the optical fibers, by binding the buffer tubes against a means for preventing thermally induced movement of the buffer tubes.

It is another object of the present invention to provide an improved fiber optic communications cable wherein the sag that is experienced after installation is minimized.

It is another object of the present invention to provide an improved lightweight fiber optic cable that may be used for prolonged periods in transmission systems operating at voltages in excess of 250 kV.

It is another object of the present invention to provide an improved fiber optic communications cable having an outer cover that is less susceptible to damage from tracking currents when used in transmission systems operating at voltages in excess of 250 kV.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
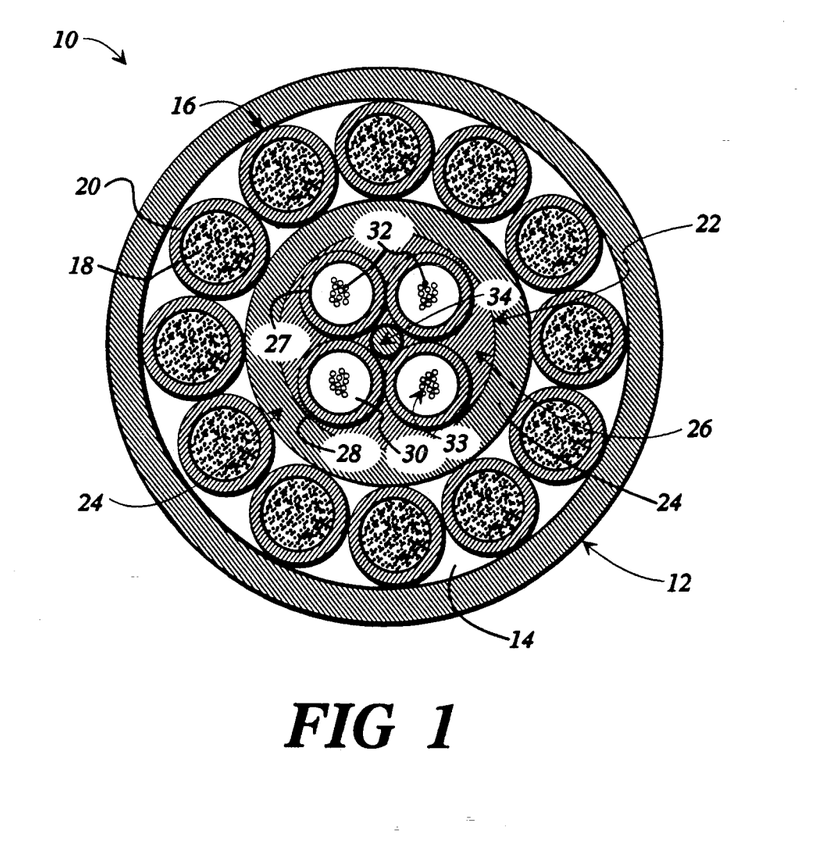
FIG. 1 is a transverse cross-sectional view of an all dielectric or non-conducting self-supporting fiber optic cable constructed in accordance with the preferred embodiment of the present invention.
Figure 2:
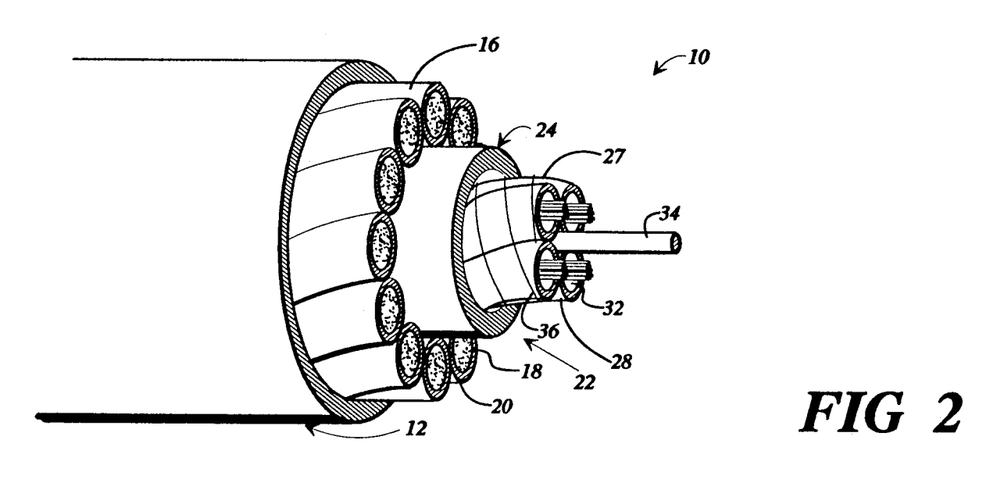
FIG. 2 is a perspective view of the preferred fiber optic cable of FIG. 1.

Referring now to the drawings, in which like numerals indicate like elements throughout the several figures, FIGS. 1 and 2 illustrate an all dielectric or non-conductive self-supporting fiber optic cable 10 embodying the present invention. The fiber optic cable 10 includes a central core 22 which contains at least one, and preferably a plurality of, buffer tubes 28. Each buffer tube in the preferred embodiment contains from two to twelve optical fibers 32. The core 22 also comprises a tubular core jacket 24 that is formed around the buffer tubes 28.

Longitudinal strength and overall protection for the central core 22 are provided by helically applied bundles of non-conducting strength members 16. Each strength members comprises a bundle of filaments 18 having high tensile strength such as Kevlar ® aramid fibers. Preferably, each bundle of filaments 18 is separately encased in its own protective and isolating jacket 20.

In the preferred embodiment, within the core jacket 24 there are four, or preferably, six fiber optic assemblies 27. The fiber optic assemblies 27 comprise buffer tubes 28 containing at least one and preferably a plurality of optical fibers 32. The buffer tubes 28 are wound about a means 34 for preventing thermally induced movement of the buffer tubes. The preferred thermally induced movement preventing means 34 comprises a glass fiber reinforced rod having a low coefficient of thermal expansion, which is substantially the same as that of the optical fibers 32. The buffer tubes 28 are tightly bound to, and therefore, in intimate contact with and surrounding the glass rod 34. The glass rod 34 therefore serves as a buffer tube thermal stabilizing means.

It will be appreciated that each buffer tube 28 contacts the glass rod 34 along its length; the friction between the buffer tube and glass rod inhibits substantial movement due to expansion or contraction of the buffer tube when the cable is subjected to varying temperatures. Since the buffer tube is substantially restricted from movement in this manner, microbending of the optical fibers is reduced. As will be understood by those skilled in the art, microbending of the optical fibers results in attenuation of the light signals transmitted therein and is undesirable.

The buffer tubes 28 in the fiber optic assemblies 27 enclose a bundle of optical fibers 32. The interstitial space between the buffer tubes 28 and the optical fibers 32 are filled with a thixotropic gel 30. The buffer tubes 28 preferably are helically wound about the glass rod 34. The buffer tubes 28 are preferably bound against the glass rod 34 by a filament or thread 36. The thread 36 holds the buffer tubes in place around the glass rod 34 during subsequent manufacturing steps including formation of the core jacket 24.

In the core 22, the interstices between the buffer tubes 28 and the core jacket 24 are filled with a water blocking compound 26 to prevent the entry and migration of water. The preferred water blocking compound is type CI-500, manufactured by Amoco Chemical Company, Chicago, Ill., which is believed to contain type CAS 9003-29-6 polybutene as one of its primary ingredients. Other types of compounds that prevent water entry and migration will also be suitable for use in the present invention.

At least one layer of stranded strength members 16 completely encloses the core 22. Each stranded strength member 16 includes a separate isolating jacket 20 around a bundle of non-conducting filaments 18. In the preferred embodiment, the filaments are formed into a bundle during manufacture by combining a plurality of ends of Kevlar ® aramid filaments into an extruder. The ends of Kevlar ® filaments form a unitary bundle when the isolating jacket is extruded over the bundle. However, it will be understood that a suitable bundle of filaments may be formed by spinning the filaments or by other filament combining methods.

The preferred isolating jacket 20 is an extruded polyethylene or other suitable protective and flexible plastic material. The material comprising the isolating jacket 20 is preferably chosen for its strength, durability, abrasion resistance and electrical insulating properties. The isolating jacket is preferably formed around the bundle of filaments 18 when forming the individual strength members 16. A plurality of separate and jacketed strength members is later wound about the core 22 to form the cable.

Although the strength members 16 in the preferred embodiment possess a circular cross section, it is believed that strength members having cross sections of other shapes, for example elliptical, trapezoidal, etc., will also be suitable for use as strength members in the present invention.

In the preferred embodiment, the fiber optic cable 10 also comprises a tubular outer jacket 12 that completely covers the stranded strength members 16 after the strength members have been wound about the core 22. In addition, the interstices between the stranded strength members 16 and the outer jacket 12 are filled with a water blocking compound 14, also a type CI-500 polybutene in the preferred embodiment.

In the preferred embodiment of the present invention, the optical fibers 32 comprise type SMF-28 single mode fibers manufactured by Corning Glass Works, Corning, N.Y. However, those skilled in the art will appreciate that other single-mode, multi-mode, and dispersion-shifted fibers are also suitable for use in the present invention. Preferably, the fibers include coloring for identification and fiber differentiation purposes. The colors and tolerances should be in accordance with EIA-359A standard colors for color identification and coding and should be compatible with the fiber coating and with the gel 30 located within the buffer tubes. Moreover, it will be understood that, preferably, optical fibers from different manufacturers should not be placed in the same cable or mixed, and not contain any factory splices.

The preferred embodiment provides strain relief for the optical fibers 32 by providing excess length for the optical fibers within the buffer tubes 28, and by winding the optical fiber assemblies 27 helically about the glass rod 34. This allows for transverse (i.e., radial or angular) movement of the fibers relative to the axis of the cable, but not for any longitudinal or axial movement in the direction of axis of the cable. Those skilled in the art will understand that other mechanisms may be employed for strain relief of the optical fibers, including the provision of transverse movement of the fibers within the buffer tubes by making the diameter of the buffer tube exceed the diameters of the optical fiber bundle 33.

The preferred buffer tube 28 is extruded around the bundle of optical fibers 33 at a relatively high temperature and assumes a shrink fit around the bundle upon cooling to ambient temperature. The buffer tube 28 is preferably a pliable, thermally insulating, weather-resistant, and temperature resistant material such as polybutylene terephthalate (PBT). However, persons skilled in the art will recognize that other pliable and weather resistant materials are available to protect the bundle 33 from environmental hazards.

A fiber optic assembly 27 comprising a buffer tube 28 and optical fiber bundle 33 with 12 or more fibers preferably has an outside diameter of about 3.0 millimeters and an average wall thickness of the buffer tube of about 0.41 millimeters. Those skilled in the art will appreciate that the above dimensions are provided for purposes of illustrating the preferred embodiment and are not intended to be limiting.

It will be understood at this juncture that many, if not all, optical fibers available for telecommunications use especially in the United States are manufactured and sold with an acrylate coating for sealing of micro cracks. Those skilled in the art will understand that acrylate has a continuous temperature rating of about 85° C., and a maximum short term rating of about 180° C. The integrity of the acrylate coating will be compromised if the optical fibers are subjected to temperatures in excess of these values. Accordingly, the present invention specifically contemplates use of such acrylate coated fibers.

Those skilled in the art will recognize that, due to their composition, the buffer tubes 28 will exhibit a tendency to shrink or expand along their longitudinal axis when exposed to extreme cold or heat, respectively. Such thermally induced movement, if allowed, may cause compressive forces to act on the optical fibers 32 and cause microbending, which results in undesirable attenuation of the light signals transmitted therein. The preferred embodiment prevents or reduces such thermally induced movement by utilizing means for preventing thermally induced movement of the buffer tubes 28. In the preferred embodiment, this means comprises a glass rod 34 having a diameter of about 0.06 inches.

The rod 34 preferably comprises a high modulus material such as glass-reinforced plastic or resin having an extremely low coefficient of thermal expansion, preferably about the same as that of the optical fibers. The buffer tubes 28 are held fast against the glass rod 34 along the length thereof by the core jacket 24 and, therefore, biased against thermally induced movement. The resulting friction between the rod 34 and the buffer tubes 28 prevents the buffer tubes 28 from exhibiting any great degree of shrinkage or expansion, and localizes the thermally induced movement in a manner so as to minimize the transmission of stress to the optical fibers. As a result, the optical fibers 32 experience minimized axial stress, and the likelihood and degree of microbending are decreased.

It will now be appreciated by those skilled in the art that a means for preventing thermally induced movement of the buffer tubes is effected by providing a thermally stable platform having a coefficient of thermal expansion similar to that of the optical fibers, against which the buffer tubes 28 and their optical fibers 32 are biased.

At this juncture, it is appropriate to discuss the effect of lay length on the amount and type of tension suffered by the optical fibers. A lay length of the buffer tubes 28 that is too short will have the effect that a bending strain is imposed on the fibers in the bundle. Bending also shortens the life expectancy of optical fibers. On the other hand, a lay length that is too long will have the effect that more axial tension and contraction can be transmitted to the fibers in the bundle, since the transformation of tension to radial movement of the optical fibers for strain relief will not occur.

Preferred lay lengths should therefore be determined to maximize tensile and contraction movement without transferring strain to the fibers while maintaining bending strain below a maximum value. In the preferred embodiment the buffer tubes 28 have a lay length of approximately two to four inches. The foregoing lay lengths have been found to provide a satisfactory compromise between axial tension and torsion on the optical fibers and satisfactory operation in accordance with the present invention. However, those skilled in the art will recognize that other lengths may be useful in the present invention.

The central core 22 preferably comprises a tubular inner core jacket 24 that is formed about the buffer tubes 28. The purpose of the core jacket 24 is to protect the buffer tubes 28 and the optical fibers 32 from radial forces exerted upon the cable. In addition, the core jacket 24 holds the buffer tubes 28 against the glass rod 34, further binding the tubes against the rod. In the preferred embodiment, the core jacket 24 is preferably made of polyethylene extruded about a plurality of buffer tubes 28 that have been tied about the glass rod 34 by the filament or thread 36. Those skilled in the art will recognize that other non-conductive materials or plastics are suitable for the core jacket 24, and that the thread 36 may also comprise a tape, cord, or other binding means.

In forming the final assembly of the preferred fiber optic cable 10, a plurality of stranded strength members 16 are wrapped about the central core 22. The purpose of the stranded strength members 16 is to provide longitudinal strength for the cable and to provide protection for the central core. In the preferred embodiment, the core 22 is surrounded by 12 separate stranded strength members 16 which are wrapped helically about the core. Each of the stranded strength members 16 comprises a bundle of non-conducting filaments 18 which are surrounded by an isolating jacket 20.

In the preferred embodiment, the filaments chosen for the stranded strength members are Kevlar®, an aramid fiber product of the DuPont Corporation, Wilmington, Del. More specifically, the filaments are made of Kevlar® 49. Additionally, those skilled in the art will recognize that S-2 glass would form an appropriate substitute for the Kevlar in the stranded strength members 16.

Each stranded Kevlar® strength member 16 comprises a specified number of "ends" of a specified denier that have been fed into an extruder that encases them in the polyethylene isolating jacket 20. One "end" of the specified denier of Kevlar contains a predetermined number of filaments so that the total number of filaments per strand is the total number of ends per strand times the number of filaments per end. The preferred strength member 16 employs approximately 4 to 13 ends of Kevlar®, with a total of about 100 to 200 filaments. Those skilled in the art will appreciate that the number of ends should be chosen to be sufficient for the design span and is not limited to the range employed in the preferred embodiment.

Those skilled in the art will appreciate that the number of ends of Kevlar® fiber placed within the strand determines the overall strength of the strength member 16. In addition, the goal during manufacture is to provide enough tension on the Kevlar® filaments so as to remove any looseness as the isolating jacket 20 is formed about the filament bundle. Once the plurality of stranded strength members 16 are formed according to the process described above, a plurality of such individually jacketed strength members 16, twelve in the preferred embodiment, are helically wound about the central core 22.

The length of lay of the layer of stranded strength members 16 is designed to give the cable a specified bend radius, but not so low that core or cable deformation are encountered under designed tension. In the preferred embodiment, the lay length of the strength members is in the range between eight and twelve inches. The present inventors intend these dimensions to be illustrative of the preferred embodiment, and not limiting.

The preferred embodiment also includes an outer jacket 12 that is formed about the outer diameter of the stranded strength members 16. The purpose of the outer jacket 12 is to provide additional protection for the stranded strength members 16 and the central core 22. The outer jacket 12 is preferably made of a plastic material such as polyethylene and should be as non-conductive as possible. Those skilled in the art will recognize that the plastics suitable for use in the invention should be chosen for their particular qualities depending on the application in which the cable is used. For example, in power distribution systems transmitting less than 138 kV, there are very few problems related to tracking currents and dry band arcing. As a result, the particular polyethylene used in an outer jacket 12 should be chosen primarily according to its strength and resistance to abrasion.

In networks transmitting voltages in excess of 138 kV, the present inventors believe it is advisable to use a track resistant outer jacket 12. Such an outer jacket may be composed of specifically compounded cross-linked polyethylenes. Such compounds may be obtained by the manufacturers of the compound by specifying desired properties such as track resistance, durability, and weather resistance. Suitable track resistant jacketing compounds may be obtained from Union Carbide Corporation, Danbury, Conn., and other chemical companies that manufacture polyethylenes.

In the preferred embodiment, the outer jacket 12 is formed about the outer diameter of the strength members 16 so that a bond is formed between the outer jacket 12 and the isolating jackets 20. This is accomplished by a process known as "pressure" extrusion, in which the outer jacket is formed quickly about the strength members. The heat which builds up during the process causes the isolating jackets 20 to melt sufficiently to allow bonding to occur between the outer jacket 12 and the isolating jacket 20. Thus, the separate stranded strength members 16 and the outer jacket 12 are unitized as a result of the extrusion process.

Those skilled in the art will appreciate that the process of pressure extrusion described above is merely representative of the preferred embodiment and not intended to be limiting. The outer jacket may also be formed by a process in which the outer jacket is "tubed" on. In this process, the extruder is set so that the inner surface of the outer jacket begins to cure before it adheres to the isolating jackets. Thus, no bond is formed between the outer jacket and the isolating jackets. It is also known that a tape made of mylar or a similar material may be interposed between the isolating jacket and the outer jacket as it is formed in order to prevent bonding between the outer jacket and the isolating jacket.

Figure 3:
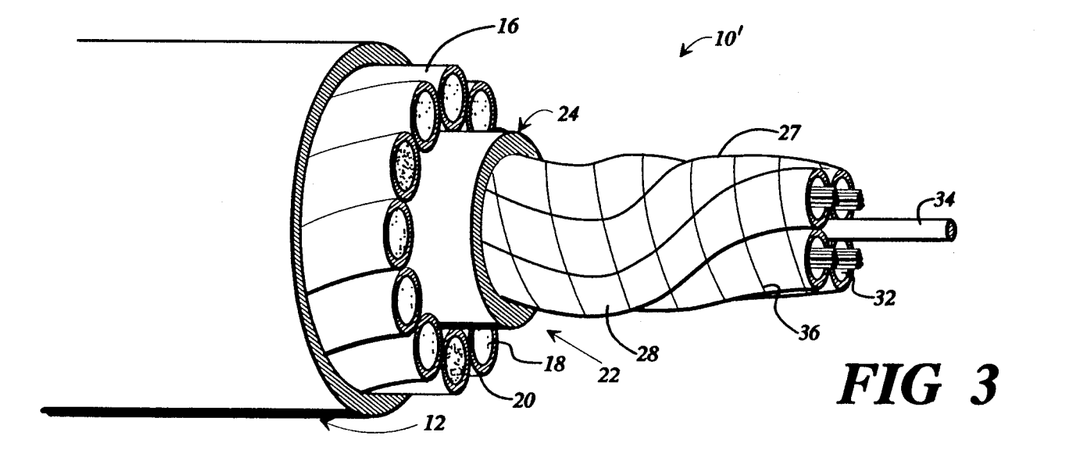
FIG. 3 is a perspective view of another embodiment of an all dielectric or non-conducting self-supporting fiber optic cable with reverse oscillating lay optic fiber buffer tubes.

FIG. 3 illustrates an alternative embodiment 10' of the present invention. In this embodiment, the buffer tubes 28' are wound about the thermal stabilizing means or rod 34 in what is called a reverse oscillating lay. In other words, the direction of winding of the buffer tubes about the rod periodically changes direction, resulting in a wavy pattern. Those skilled in the art will appreciate that the reverse oscillating lay depicted in FIG. 3 is exaggerated for the purposes of this illustration, and that the actual lay length of the buffer tubes 28 may be longer or shorter, as desired.

Upon completion of the preferred fiber optic cables 10 constructed in accordance with the present invention as described hereinabove, the rated breaking strength of the completed cable may be taken as the amount of force which the cable can withstand before the fibers pick up strain. Those skilled in the art will understand and appreciate that the amount of stress the cable can withstand before breaking is considerably greater than the amount of stress the cable can experience before strain is imparted to the optical fibers. This strain results in attenuation and degrades the fibers' ability to transmit light.

Because an all dielectric self-supporting fiber optic cable 10 constructed in accordance with the present invention is typically installed as a cable suspended between two or more support towers and in the proximity of the electrical conductors and electrical power transmission network, the combination of the helical winding of the buffer tubes 28, and the enclosure of the fiber optic bundle 33 within the pliable buffer tubes 28 protects the optical fibers from the axial tension along the stranded strength members 16 and the central core 22. Of course, the stranded strength members 16 limit the extent of movement, and the buffer tubes 28 experience radially compressive forces. This spring-like twisting effect protects the optic fiber bundle 33 from axial tension.

It will now be appreciated that an all dielectric self-supporting fiber optic cable 10 constructed in accordance with the present invention is able to provide increased protection against catastrophic failure resulting from damage to the outer covering when compared to prior art constructions. This increased protection is provided by the separate stranded strength members 16, each of which comprises a bundle of Kevlar ® filaments 18 that is enclosed within a separate isolating jacket 20. By isolating the separate strands of strength members, the volume of water that might enter the cable in the event the outer cover 12 is punctured is minimized along with the risk of damage or failure due to induced currents or increased weight. In addition, isolating the separate strands also minimized the number of filaments 18 which are exposed to ultraviolet light in the event the outer jacket 12 is penetrated. This reduces the likelihood that the cable will fail due to degradation of the strength members 16 which can result from prolonged exposure to ultraviolet light.

Figure 4:
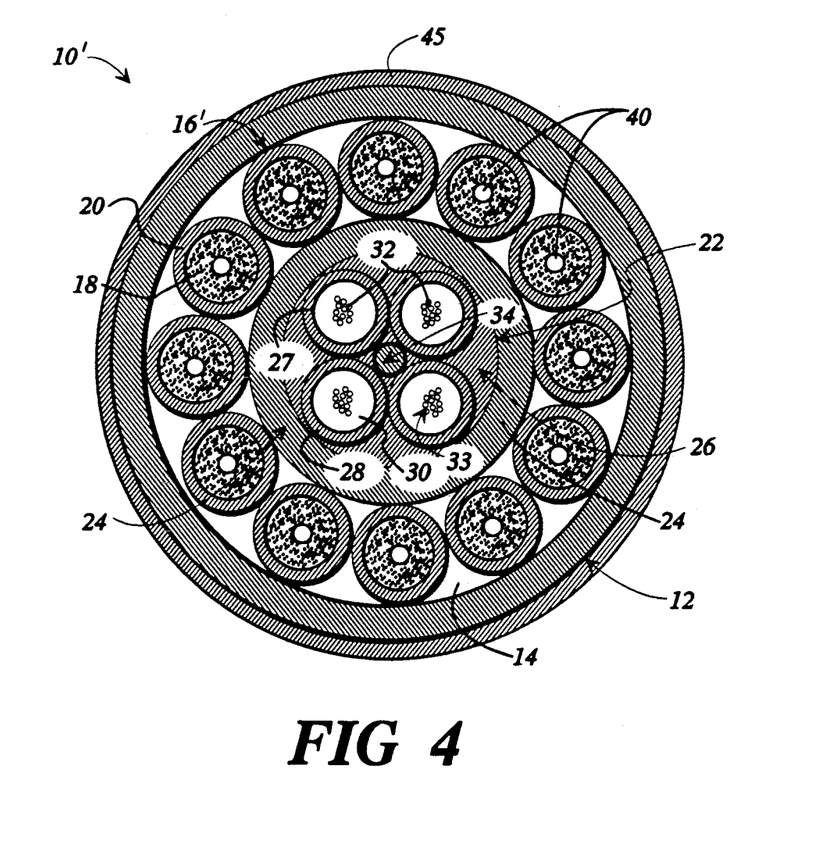
FIG. 4 is a transverse cross sectional view of a field protected all dielectric self-supporting fiber optic cable constructed in accordance with a second embodiment of the present invention.

FIG. 4 illustrates a field protected all dielectric self-supporting fiber optic cable 10' constructed in accordance with two independent aspects of the present invention. These aspects of the present invention may be used singularly or in combination to provide the advantages herein described. The fiber optic cable 10' incorporates each of the elements described in connection with the fiber optic cable 10 (shown in FIG. 1) and further includes reinforcing elements 40 that form a part of the stranded strength members 16' and a faraday shield 45 that surrounds the outer jacket 12.

As discussed earlier, extruded plastic jackets tend to shrink along their longitudinal axes as they cure, If the shrinkage results in the compression of load bearing fibers or filaments, a cable may tend to stretch when it is installed between towers in a power distribution system. This stretching may result in damage to the optical fibers and reduced ground clearance as the cable sags. In certain alternative embodiments of the present invention, each stranded strength member includes a reinforcing element in addition to the load bearing filaments and isolating jacket.

In order to minimize the compression of the non-conducting filaments 18 after the isolating jacket 20 is extruded, the preferred cable 10' includes a reinforcing element 40 as a central strength member for the strength members 16. The preferred reinforcing element 40 is a small fiberglass rod. The non-conducting filaments 18 are bundled about the rod 40 and fed into the machine that extrudes the isolating jacket 20 about the bundle formed by the filaments 18 and the reinforcing element 40. As the isolating jacket cools, the friction between the non-conducting filaments 18 and the reinforcing element 40 greatly reduces the amount of compression experienced by the filaments 18 during the curing process.

In the preferred embodiment of the fiber optic cable 10', the reinforcing element 40 is made of a material having high longitudinal strength, such as fiberglass or the like, and has a diameter of approximately 0.5 to 1.5 millimeters. The stranded strength member 16' is formed when the reinforcing element 40 is surrounded by preferably 4 to 16, or more, ends of Kevlar ® brand filament 18 and the isolating jacket 20 is extruded about the bundle.

The present inventors believe that the shrinkage of a stranded strength member 16' constructed without the reinforcing element is in the range of approximately 0.1 to 0.4 percent. With the addition of the reinforcing element 40, it is believed that the shrinkage is reduced to approximately 0.01 to 0.05 percent. It will thus be appreciated that the longitudinal compression of the load bearing filaments during manufacture is greatly reduced. As a result, the cables can be strained to higher levels before strain is transmitted to the optical fibers. Thus, sagging and damage to the optical fibers experienced during installation are reduced.

As discussed earlier, prior art all dielectric cables are susceptible to failure as a result of tracking currents induced by strong electric fields found in the vicinity of phase conductors. Although various approaches have been developed to address the problems associated with arcing, there are still problems at extremely high voltages. The fiber optic cable 10' constructed in accordance with another embodiment of the present invention includes a faraday shield 45 formed about at least a portion of the cable's outer jacket 12. The purpose of the faraday shield 45 is to provide a field protected all dielectric self-supporting fiber optic cable that may be used in high voltage transmission systems operating at or above 275 kV while maintaining the advantages of prior art all dielectric self-supporting fiber optic cables such as light weight and durability.

The present inventors have provided a novel approach by providing a variety of embodiments (shown in FIGS. 5A–5D) incorporating a faraday shield 45 that surrounds at least a portion of the outer jacket 12. Generally, the faraday shield 45 is operative to bring the electric field to zero in the vicinity of the plastic jacket, and thus eliminate the electric currents and arcing on the surface of the cable jacket. In other configurations, the faraday shield 45 may be grounded in order to drain off the induced currents and reduce the likelihood of injury in the event a power company employee or other person comes in contact with the cable.

Generally described, a faraday shield 45 constructed in accordance with the present invention will be formed of lightweight electrically conductive material such as a metallized layer or foil, or small diameter aluminum conductors. The metallized foil has a thickness that is thin in relation to the thickness of the outer jacket 12 and maintains the advantage of light weight associated with prior art all dielectric cables. The diameter of the aluminum conductors will be small with respect to the diameter of the stranded strength members 16, and will also be lightweight.

It is well known that if a volume surrounded by a conducting sphere or surface is placed in an electric field, the electric field will not exist within the conducting volume. In addition, such a conducting volume need not be solid or continuous, but may be constructed with open spaces or gaps. The size of the open spaces or gaps depends on the wave length of the electric current that generating the electric field.

As a result, the present inventors believe that a faraday shield 45 constructed in accordance with the present invention may include periodic, spaced apart shields or segments that are non-continuous along the length of the cable 10'. The incorporation of such non-continuous, spaced apart faraday shields addresses the problem of dry-band arcing by eliminating the electric field in the vicinity of the plastic outer jacket 12 but does not cause the cable 10' to be conductive along its length. Those skilled in the art will appreciate that by producing a cable 10' that is not conductive along its length, hazards or concerns regarding electric shock resulting from downed wires or similar circumstances is greatly reduced.

Figure 5A:
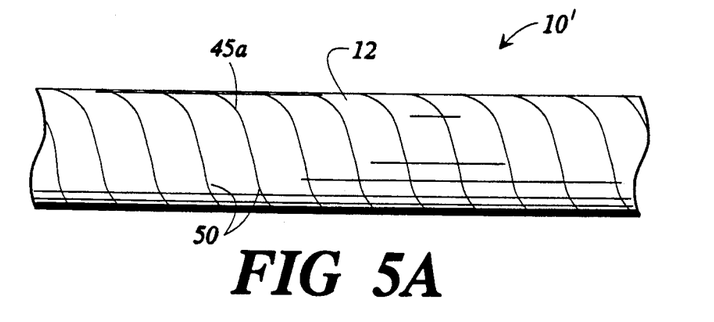
FIGS. 5A–5D are transverse views of field protected all dielectric self-supporting fiber optic cables constructed in accordance with alternative embodiments of the present invention.

FIGS. 5A–5D illustrate alternative embodiments of a faraday shield constructed in accordance with the present invention. FIG. 5A illustrates a fiber optic cable 10' in which the faraday shield 45a is formed by at least one lightweight, small diameter aluminum conductor 50 that is stranded around the outer jacket 12 of the all dielectric self-supporting fiber optic cable described above. It will also be appreciated that both the number of aluminum conductors and the spacing between the conductor may be varied in order to provide alternative embodiments. In addition, the faraday shields so formed may be continuous along the length of the cable, or may be formed about discrete spaced apart portions of the cable.

Figure 5B:
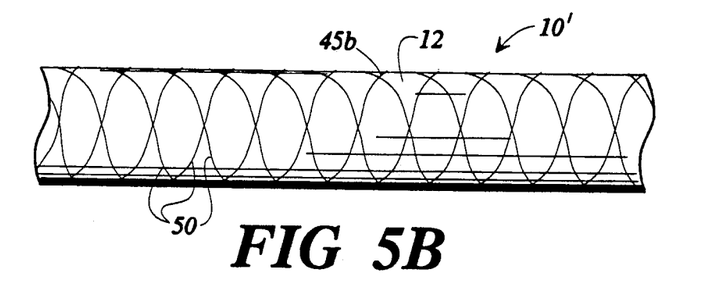

FIG. 5B illustrates another embodiment of the fiber optic cable 10' in which the faraday shield 45b is formed by a plurality of lightweight, small diameter aluminum conductors 50 that are braided around the outer jacket 12. As in the case of the stranded conductors, the number and lay length may be varied to provide alternative embodiments.

Figure 5C:
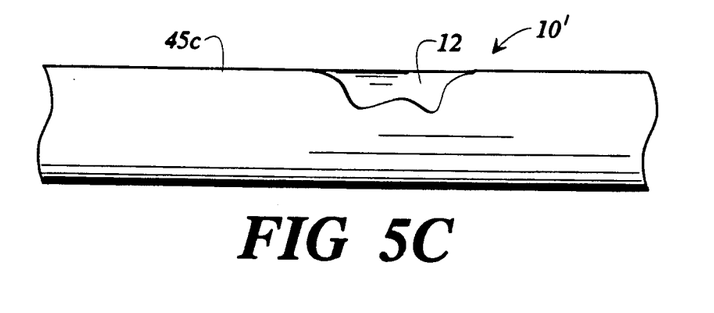

FIG. 5C illustrates another embodiment of the fiber optic cable 10' in which the faraday shield 45c is constructed from a metallized layer or foil that is formed along the outer jacket 12 of the cable.

Figure 5D:
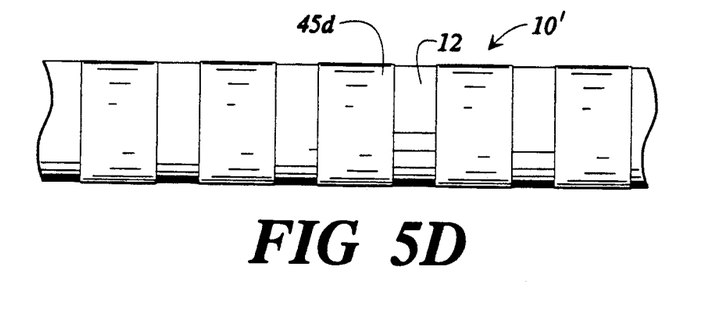

FIG. 5D illustrates another embodiment of the fiber optic cable 10' in which the faraday shield 45d is formed by periodic, spaced apart segments of a metallized layer or foil that are placed along the outer jacket of the cable 10'. Those skilled in the art will appreciate that a faraday shield 45 constructed in accordance with the present invention need not be connected to ground at all.

If the faraday shield extends along the entire length of the cable 10', it will be understood that the faraday shield 45 is operative to cause the cable 10' to be electrically conductive along its entire length. As a result, the "dry-bands" known to prior art cables will be eliminated, and the arcing associated therewith will be non-existent. Accordingly, there will be no intense heat or chemical reactions to cause damage to the plastic outer jacket 12.

Those skilled in the art will also appreciate that a faraday shield 45 constructed in accordance with the present invention may be constructed in segments, wherein each segment is grounded only at one tower. By doing so, the cable is no longer conductive along its entire length. However, induced currents will be able to flow along the length of the cable to the grounding towers, and the dry-band arcing and associated problems are likewise eliminated.

From the foregoing description, those skilled in the art can now appreciate that the faraday shield 45 of the present invention provides an outer conductive or semiconductive coating for purposes of bringing the electric field to zero in the vicinity of the plastic portions of the cable 10'. By doing so, the induced currents, dry-band arcing and resulting damage to the plastic cover are substantially reduced or eliminated. A cable constructed in this manner may be used in transmission systems operating in excess of 275 kV without experiencing the damage and failure common to prior art all dielectric cable products.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A field protected self-supporting fiber optic cable, comprising:
   a central core comprising at least one optical fiber contained within said core;
   at least one layer comprising a plurality of non-conducting stranded strength members wound about said core;
   a non-conducting tubular outer jacket formed about said stranded strength members; and
   a faraday shield formed about at least a portion of said outer jacket.

2. The fiber optic cable of claim 1, further comprising a non-conducting tubular core jacket formed about said central core.

3. The fiber optic cable of claim 1, wherein each at least one optical fiber is contained within at least one buffer tube.

4. The fiber optic cable of claim 1, wherein said core further comprises means for preventing thermally induced movement of said at least one buffer tube.

5. The fiber optic cable of claim 4, wherein said thermally induced movement preventing means comprises a cylindrical member positioned coaxially within said core and about which said at least one buffer tube is wound.

6. The fiber optic cable of claim 5, further comprising a plurality of buffer tubes, each containing at least one optical fiber, and wherein said buffer tubes are wound about said cylindrical member to form a helix.

7. The fiber optic cable of claim 1, wherein said strength members comprise an aramid fiber.

8. The fiber optic cable of claim 1 further comprising means encapsulating each one of said plurality of strength members.

9. The fiber optic cable of claim 8, wherein said encapsulating means comprises polyethylene.

10. The fiber optic cable of claim 8, wherein said strength members further comprise a reinforcing element.

11. The fiber optic cable of claim 10, wherein said reinforcing element comprises a cylindrical member positioned coaxially within said strength member.

12. The fiber optic cable of claim 11, wherein said reinforcing element comprises a fiberglass rod.

13. The fiber optic cable of claim 1, wherein said outer jacket comprises polyethylene.

14. The fiber optic cable of claim 1, wherein said faraday shield comprises aluminum.

15. The fiber optic cable of claim 1, wherein said faraday shield comprises a metallic film.

16. The fiber optic cable of claim 1, wherein said faraday shield comprises braided metal wire.

17. The fiber optic cable of claim 1, wherein said faraday shield comprises stranded metal wire.

18. The fiber optic cable of claim 1, wherein said faraday shield comprises periodic, spaced apart metal shields.

19. The fiber optic cable of claim 1, wherein said faraday shield comprises at least one segment, including a metal shield.

20. The fiber optic cable of claim 19, further comprising a plurality of segments, wherein each segment is grounded at one location.

21. An all dielectric self-supporting fiber optic cable, comprising:
   a central core comprising at least one optical fiber;
   at least one layer of non-conductive stranded strength members wound about said core, said strength members comprising a plurality of elongate non-conducting filaments formed into individual bundles about a reinforcing element; and
   means encapsulating each one of said plurality of strength members.

22. The fiber optic cable of claim 21, wherein said optical fibers are located within at least one buffer tube.

23. The fiber optic cable of claim 22, further comprising a cylindrical member positioned coaxially within said core and about which said at least one buffer tube is wound.

24. The fiber optic cable of claim 23, further comprising a plurality of buffer tubes, each containing at least one optical fiber, and wherein said buffer tubes are wound about said cylindrical member to form a helix.

25. The fiber optic cable of claim 21, further comprising a non-conducting tubular core jacket formed about said central core.

26. The fiber optic cable of claim 21, wherein said non-conducting filaments comprise an aramid fiber.

27. The fiber optic cable of claim 21, wherein said encapsulating means comprises polyethylene.

28. The fiber optic cable of claim 21, further comprising a non-conducting tubular outer jacket formed about said stranded strength members.

29. The fiber optic cable of claim 21, wherein said reinforcing element comprises a cylindrical member positioned coaxially with said strength member.

30. The fiber optic cable of claim 29, wherein said reinforcing element comprises a fiberglass rod.

31. The fiber optic cable of claim 21, further comprising a faraday shield.

32. A field protected self-supporting fiber optic cable, comprising:
   a central core comprising at least one optical fiber contained within at least one buffer tube within said core;
   a cylindrical member located within said central core, said buffer tubes being wound about said cylindrical member;
   a non-conducting tubular core jacket formed about said central core;
   at least one layer of stranded strength members wound about said inner jacket, said strength members comprising a plurality of elongate non-conducting fibers formed into individual bundles about a reinforcing element;
   means encapsulating each of said plurality of strength members;
   a non-conducting tubular outer jacket formed about said stranded strength members; and
   a faraday shield formed about at least a portion of said outer jacket.

33. The fiber optic cable of claim 32, wherein said core jacket comprises polyethylene.

34. The fiber optic cable of claim 32, further comprising a plurality of buffer tubes, each containing at least one optical fiber, and wherein said buffer tubes are wound about said cylindrical member to form a helix.

35. The fiber optic cable of claim 32, wherein said non-conducting fibers comprise an aramid fiber.

36. The fiber optic cable of claim 32, wherein said reinforcing element comprises a cylindrical member positioned coaxially within said strength member.

37. The fiber optic cable of claim 32, wherein said reinforcing element comprises a fiberglass rod.

38. The fiber optic cable of claim 32, wherein said encapsulating means comprises polyethylene.

39. The fiber optic cable of claim 32, wherein said outer jacket comprises polyethylene.

40. The fiber optic cable of claim 32, wherein said faraday shield comprises aluminum.

41. The fiber optic cable of claim 32, wherein said faraday shield comprises a metallic film.

42. The fiber optic cable of claim 32, wherein said faraday shield comprises braided metal wire.

43. The fiber optic cable of claim 32, wherein said faraday shield comprises stranded metal wire.

44. The fiber optic cable of claim 32, wherein said faraday shield comprises periodic, spaced apart metal shields.

45. The fiber optic cable of claim 32, wherein said faraday shield comprises at least one segment, including a metal shield.

46. The fiber optic cable of claim 45, further comprising a plurality of segments, wherein each segment is grounded at one location.

47. A field protected self-supporting fiber optic cable comprising:
   an all dielectric self-supporting fiber optic cable; and
   a faraday shield positioned about at least a portion of the cable's exterior.

* * * * *